United States Patent
Qu et al.

(10) Patent No.: US 9,762,608 B1
(45) Date of Patent: *Sep. 12, 2017

(54) DETECTING MALWARE

(71) Applicant: Palo Alto Networks, Inc., Santa Clara, CA (US)

(72) Inventors: Bo Qu, Fremont, CA (US); Xinran Wang, San Ramon, CA (US); Kyle Sanders, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,459

(22) Filed: Jul. 7, 2015

Related U.S. Application Data

(63) Continuation of application No. 13/631,654, filed on Sep. 28, 2012, now Pat. No. 9,104,870.

(51) Int. Cl.
*H04L 29/06* (2006.01)
*H04L 29/08* (2006.01)

(52) U.S. Cl.
CPC .......... *H04L 63/1441* (2013.01); *H04L 67/10* (2013.01)

(58) Field of Classification Search
CPC ........ G06F 11/00; G06F 12/14; G06F 21/554; H04L 63/1441; H04L 67/10
USPC .......................................... 726/1, 22, 23, 25
See application file for complete search history.

(56) References Cited

U.S. PATENT DOCUMENTS

| | | |
|---|---|---|
| 7,603,713 B1 | 10/2009 | Belov |
| 7,823,202 B1 | 10/2010 | Nucci et al. |
| 7,930,273 B1 | 4/2011 | Clark |
| 7,945,908 B1 | 5/2011 | Waldspurger |
| 8,151,352 B1 | 4/2012 | Novitchi |
| 8,209,680 B1 * | 6/2012 | Le ..................... G06F 17/30067 713/1 |
| 8,239,492 B2 | 8/2012 | Pottenger |
| 8,347,100 B1 | 1/2013 | Thornewell et al. |
| 8,364,664 B2 | 1/2013 | Bennett |
| 8,495,742 B2 | 7/2013 | Abadi et al. |
| 8,533,842 B1 | 9/2013 | Satish |
| 8,566,928 B2 | 10/2013 | Dagon |
| 8,566,946 B1 * | 10/2013 | Aziz ..................... G06F 21/554 726/15 |
| 8,631,489 B2 | 1/2014 | Antonakakis et al. |
| 8,646,071 B2 | 2/2014 | Pereira et al. |

(Continued)

OTHER PUBLICATIONS

Nazario et al., As the Net Churns: Fast-Flux Botnet Observations, IEEE, pp. 24-31, Sep. 5, 2008.

(Continued)

*Primary Examiner* — Abu Sholeman
(74) *Attorney, Agent, or Firm* — Van Pelt, Yi & James LLP

(57) ABSTRACT

A candidate malware that potentially includes at least one malicious element is received. The candidate malware is executed using a virtualized environment. A determination is made that the candidate malware, while executing using the virtualized environment, has taken at least one anti-virtual machine action, wherein the anti-virtual machine action is indicative of an attempt by the candidate malware to evade detection of the malicious element by the system when the candidate malware is executed using a virtualized environment. In response to the determination, an alert that the candidate malware is malicious is generated as output.

20 Claims, 4 Drawing Sheets

(56) References Cited

U.S. PATENT DOCUMENTS

| | | | |
|---|---|---|---|
| 8,763,071 B2 | 6/2014 | Sinha | |
| 8,763,125 B1* | 6/2014 | Feng | G06F 21/56 713/175 |
| 8,813,240 B1 | 8/2014 | Northup | |
| 8,826,426 B1 | 9/2014 | Dubey | |
| 8,893,124 B2 | 11/2014 | Bork | |
| 8,931,088 B2 | 1/2015 | Chen | |
| 8,966,625 B1 | 2/2015 | Zuk et al. | |
| 9,049,221 B1 | 6/2015 | Yen | |
| 9,117,079 B1 | 8/2015 | Huang | |
| 9,141,801 B2 | 9/2015 | Moon | |
| 9,152,694 B1* | 10/2015 | Padidar | G06F 17/30598 |
| 9,183,383 B1* | 11/2015 | Yablokov | G06F 21/56 |
| 9,223,962 B1 | 12/2015 | Kashyap | |
| 9,294,486 B1 | 3/2016 | Chiang | |
| 9,317,680 B2 | 4/2016 | Carter, III et al. | |
| 9,361,089 B2* | 6/2016 | Bradfield | G06F 21/53 |
| 9,591,003 B2* | 3/2017 | Johansson | G06F 21/554 |
| 2003/0191911 A1* | 10/2003 | Kleinschnitz, Jr. | G06F 8/63 711/154 |
| 2004/0107416 A1* | 6/2004 | Buban | G06F 8/68 717/170 |
| 2004/0133796 A1* | 7/2004 | Cohen | G06F 21/566 726/24 |
| 2005/0240756 A1 | 10/2005 | Mayer | |
| 2005/0283837 A1 | 12/2005 | Olivier | |
| 2006/0021029 A1 | 1/2006 | Brickell et al. | |
| 2007/0039053 A1 | 2/2007 | Dvir | |
| 2007/0079375 A1* | 4/2007 | Copley | G06F 21/566 726/22 |
| 2007/0106986 A1 | 5/2007 | Worley et al. | |
| 2007/0174915 A1* | 7/2007 | Gribble | G06F 21/53 726/24 |
| 2008/0127338 A1 | 5/2008 | Cho et al. | |
| 2008/0155694 A1 | 6/2008 | Kwon et al. | |
| 2008/0177755 A1* | 7/2008 | Stern | G06F 21/568 |
| 2008/0263658 A1* | 10/2008 | Michael | G06F 21/562 726/22 |
| 2009/0007100 A1 | 1/2009 | Field et al. | |
| 2009/0036111 A1* | 2/2009 | Danford | H04L 41/0893 455/419 |
| 2009/0077383 A1 | 3/2009 | de Monseignat | |
| 2009/0150419 A1* | 6/2009 | Kim | G06F 21/568 |
| 2009/0235357 A1 | 9/2009 | Ebringer | |
| 2009/0241190 A1* | 9/2009 | Todd | G06F 21/53 726/23 |
| 2009/0254989 A1* | 10/2009 | Achan | H04L 63/1441 726/22 |
| 2009/0265786 A1 | 10/2009 | Xie et al. | |
| 2010/0037314 A1 | 2/2010 | Perdisci et al. | |
| 2010/0281458 A1* | 11/2010 | Paladino | G06F 8/71 717/106 |
| 2011/0090911 A1* | 4/2011 | Hao | H04L 12/4633 370/395.53 |
| 2011/0161955 A1 | 6/2011 | Woller et al. | |
| 2011/0173698 A1* | 7/2011 | Polyakov | G06F 11/0748 726/23 |
| 2011/0208714 A1 | 8/2011 | Soukal et al. | |
| 2011/0239299 A1 | 9/2011 | Chen et al. | |
| 2011/0271342 A1* | 11/2011 | Chung | G06F 21/554 726/23 |
| 2011/0276695 A1* | 11/2011 | Maldaner | H04L 41/00 709/226 |
| 2011/0283360 A1 | 11/2011 | Abadi et al. | |
| 2012/0042381 A1 | 2/2012 | Antonakakis et al. | |
| 2012/0054869 A1 | 3/2012 | Yen et al. | |
| 2012/0084860 A1* | 4/2012 | Cao | H04L 63/1441 726/23 |
| 2012/0192274 A1* | 7/2012 | Odom | G06F 21/121 726/23 |
| 2012/0291042 A1 | 11/2012 | Stubbs et al. | |
| 2013/0091350 A1* | 4/2013 | Gluck | H04L 63/0281 713/153 |
| 2013/0117848 A1 | 5/2013 | Golshan | |
| 2013/0152200 A1 | 6/2013 | Alme | |
| 2013/0212684 A1* | 8/2013 | Li | G06F 17/30522 726/25 |
| 2013/0232574 A1 | 9/2013 | Carothers | |
| 2014/0283037 A1* | 9/2014 | Sikorski | G06F 21/563 726/22 |
| 2014/0337836 A1* | 11/2014 | Ismael | G06F 9/455 718/1 |
| 2015/0047033 A1 | 2/2015 | Thomas | |
| 2015/0067862 A1 | 3/2015 | Yu | |
| 2015/0074810 A1 | 3/2015 | Saher | |
| 2015/0195299 A1* | 7/2015 | Zoldi | H04L 63/1441 726/25 |
| 2016/0036836 A1 | 2/2016 | Grill | |

OTHER PUBLICATIONS

Shabtai et al., Andromaly: A Behavioral Malware Detection Framework for Android Devices, J Intell Inf Syst (2012) 38:161-190, Springer, Jan. 6, 2011.

Barr, The VMware Mobile Virtualization Platform: Is that a Hypervisor in your Pocket?, Dec. 2010, VMware, pp. 124-135.

* cited by examiner

```
#define VMWARE_HYPERVISOR_MAGIC 0x564D5868
define VMWARE_HYPERVISOR_PORT  0x5658 define VMWARE_PORT_CMD_GETVERSION    10 define VMWARE_PORT(cmd, eax, ebx, ecx, edx)                \
    __asm__("inl (%%dx)" :                                  \
            "=a"(eax), "=c"(ecx), "=d"(edx), "=b"(ebx) :    \
            "0"(VMWARE_HYPERVISOR_MAGIC),                   \
            "1"(VMWARE_PORT_CMD_##cmd),                     \
            "2"(VMWARE_HYPERVISOR_PORT), "3"(UINT_MAX) :    \
            "memory");

int hypervisor_port_check(void)
{
    uint32_t eax, ebx, ecx, edx;
    VMWARE_PORT(GETVERSION, eax, ebx, ecx, edx);
    if (ebx == VMWARE_HYPERVISOR_MAGIC)
        return 1;          // Success - running under VMware
    else
        return 0;
}
```

FIG. 4

DETECTING MALWARE

CROSS REFERENCE TO OTHER APPLICATIONS

This application is a continuation of co-pending U.S. patent application Ser. No. 13/631,654, entitled DETECTING MALWARE filed Sep. 28, 2012 which is incorporated herein by reference for all purposes.

BACKGROUND OF THE INVENTION

Nefarious individuals attempt to compromise computer systems in a variety of ways. As an example, such individuals may embed or otherwise include malicious software ("malware") in email attachments and transmit or cause them to be transmitted to unsuspecting users. An administrator of the recipient computer system can attempt to prevent compromise by blocking all downloads of all attachments by the computer system. However, such a policy will also prevent legitimate attachments from being available to the user. As an alternate approach, the administrator can require that a security scan be performed prior to the download of an attachment. Unfortunately, malware authors are crafting increasingly sophisticated malware that is increasingly able to evade detection. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 4 illustrates an example of code which can be used to determine whether a process is executing in a virtual environment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
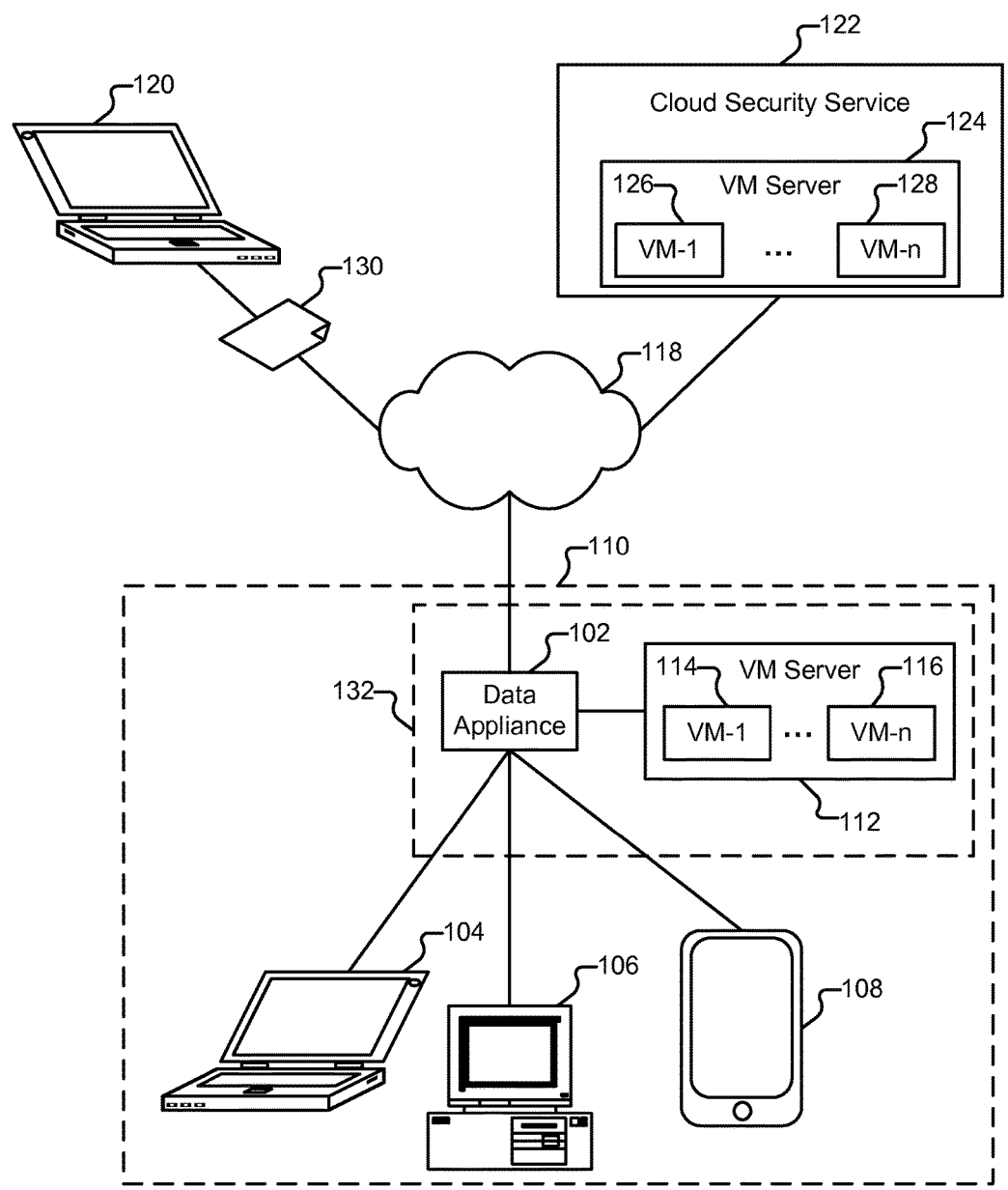
FIG. 1 illustrates an example of an environment in which malware is detected and prevented from causing harm.

FIG. 1 illustrates an example of an environment in which malware is detected and prevented from causing harm. In particular, a variety of attempts by a malicious individual to propagate malware (such as malware 130) via system 120 are described, as are techniques for thwarting that propagation.

In the example shown in FIG. 1, client devices 104-108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis. As another example, service 122 can provide a list of signatures of known-malicious documents to appliance 102 as part of a subscription. Those signatures can be generated by service 122 in conjunction with the techniques described herein.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured).

Figure 2:
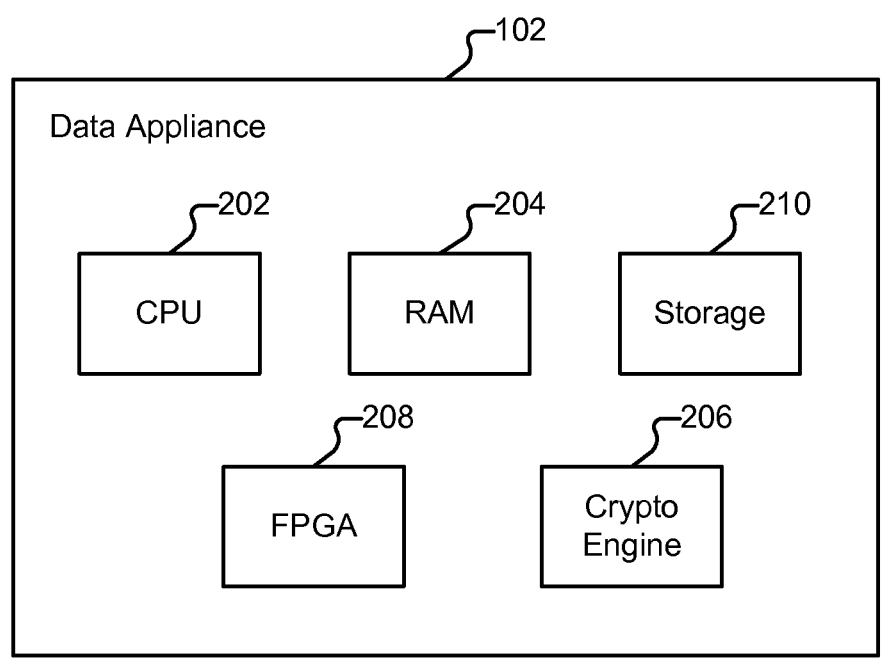
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Attachments

A virtual machine (VM) can be used to perform behavior profiling (e.g., in a VM sandbox environment) using various heuristic-based analysis techniques that can be performed in real-time during a file transfer (e.g., during a file/attachment download). As one example, suppose a malicious user of system 120 sends an email message to a user of client 104 that includes a malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis.

Virtual machine server 112 is configured to execute (or open, as applicable) the attachment in one or more virtual machines 114-116. The virtual machines may all execute the same operating system (e.g., Microsoft Windows) or may execute different operating systems or versions thereof (e.g., with VM 116 emulating an Android operating system). In some embodiments, the VM(s) chosen to analyze the attachment are selected to match the operating system of the intended recipient of the attachment being analyzed (e.g., the operating system of client 104). Observed behaviors resulting from executing/opening the attachment (such as changes to certain platform, software, or registry settings) are logged and analyzed for indications that the attachment is malicious. In some embodiments the log analysis is performed by the VM server (e.g., VM server 112). In other embodiments, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the attachment is determined to be malicious, appliance 102 can automatically block the file download based on the analysis result. Further, a signature can be generated and distributed (e.g., to other data appliances) to automatically block future file transfer requests to download the file determined to be malicious.

Detecting Anti-Virtual Machine Actions

Malware authors use increasingly sophisticated techniques when crafting their malware so that it avoids detection by security systems. One such technique is to have the malware attempt to determine whether it is executing in a virtual machine environment, and if so, to stop executing or otherwise not engage in malicious activities.

In various embodiments, malware analysis system 132 is configured to detect attempts (e.g., by an attachment executing in a virtual machine) to detect that it is executing within a virtual machine environment. Any such attempts (also referred to herein as "anti-virtual machine actions") are treated as malicious actions and will result in the attachment being classified as malicious. A variety of techniques for detecting anti-virtual machine actions will be described in conjunction with FIG. 3.

Figure 3:
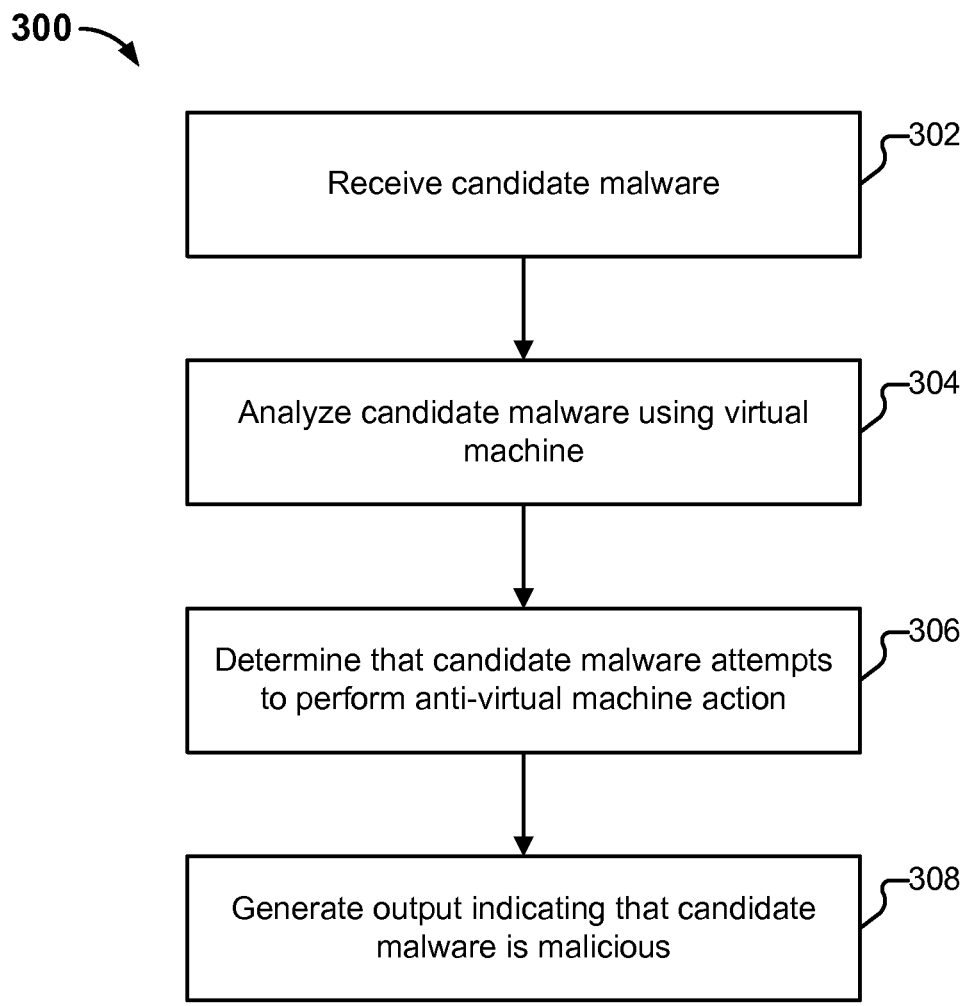
FIG. 3 illustrates an embodiment of a process for detecting an anti-virtual machine action.

FIG. 3 illustrates an embodiment of a process for detecting an anti-virtual machine action. In various embodiments, process 300 is performed by malware analysis system 132. The process begins at 302 when candidate malware is received. As one example, candidate malware is received at 302 when an email (including an attachment) is received by data appliance 102 from system 120. As another example, data appliance 102 can be configured to transmit the attachment to service 122 for analysis. In that scenario, the candidate is received by service 122 at 302.

At 304, the candidate malware is analyzed using one or more virtual machines. For example, the candidate malware can be executed in virtual machine 114 and any behaviors logged for analysis by system 132. As another example, the candidate malware can be executed in virtual machines 126-128 and analyzed by service 122.

The following are examples of anti-virtual machine actions:

The candidate malware attempts to check the product ID of a Microsoft Windows install.

The candidate malware attempts to check the computer name.

The candidate malware attempts to check the name of hardware, such as the name of a harddrive (e.g., because a virtual machine will by default have a harddrive name indicative of the fact that it is a virtual machine).

The candidate malware attempts to check a MAC address (e.g., because a virtual machine will by default have a MAC that conforms to a specific pattern).

Additional anti-virtual machine actions are discussed below.

At 306, a determination is made as to whether anti-virtual machine actions (such as, but not limited to those described herein) have taken place. And, if so, at 308, output is generated that indicates that the candidate malware is malicious. As one example, at 308 a signature for the attachment is generated (e.g., as an MD5 hash-based signature). As another example, instead of or in addition to generating a signature, an alert is generated that instructs data appliance 102 not to provide the attachment to client 104.

In various embodiments, system 132 is configured to thwart anti-virtual machine actions. For example, virtual machine server 112 can be configured to provide virtual machines such as virtual machine 114 with randomized product IDs. As another example, the computer name associated with virtual machine 114 can be randomized. As yet another example, the computer name associated with virtual machine 114 can be set to a very common name, such as "HOME" or "WORKGROUP." As yet another example, the harddrive name can be randomized or set to a very common name. As yet another example, the MAC address can be randomized.

VM-Specific Opcodes

An additional way that malware can attempt to ascertain whether it is being run in a virtual machine is by attempting to use a specific sequence of opcodes that are only supported in given virtualized environments. Illustrated in FIG. 4 is an example of code, which if included in malware, could be used by the malware to detect whether or not the malware is being executed in a VMware environment.

In some embodiments, system 132 is configured to perform static analysis of candidate malware. In particular, it is configured to look for the presence in the candidate malware of functions/methods/opcodes that are only supported in virtualized environments.

In addition to or instead of performing such static analysis, system 132 can also be configured to apply one or more hotpatches to a virtual machine such as virtual machine 114. As one example, a hotpatch can be used to hook the hypervisor layer to return a FAIL (or a random string) instead of revealing to the malware that it is executing in a virtualized environment (e.g., because a string containing "vmware" would otherwise be returned). As another example, the hotpatch can be used to implement detailed logging (e.g., to obtain a detailed call graph).

Sophisticated malware might attempt to detect whether hotpatches have been applied (i.e., the running environment has been hooked). As an example, suppose the malware calls "LoadLibraryA" and "GetProcAddress" to get the original binary code from system files, and compares it with the version that is in memory (e.g., using memcmp). In some embodiments, system 132 is configured to monitor for such function calls. For example, which API calls are being made can be logged and analyzed. If calls indicative of attempts to detect API hooking are observed, the candidate malware is deemed to be taking anti-virtual machine actions and is flagged as malicious accordingly. Further, system 132 can be configured to thwart hotpatch detection by allowing a portion of memory to be writable and executable, but not readable.

In the event that malware determines it is operating in a hooked environment, it might simply cease executing. It may also attempt to restore the hooked portion back to its original state. Any such restore attempts can be monitored for by system 132 and, if observed, treated as anti-virtual machine actions. In some embodiments, system 132 is configured to take steps to counteract any efforts by malware to revert hooked portions. As one example, a standalone thread can be used to periodically check that hotpatches that ought to have been applied are still present. A second approach is to perform on-demand checking. For example, whenever the function "WriteFile" is called, system 132 can perform a check that "CreateFileA"/"CreateFileW" is restored.

Sleep

One additional approach that malware might use to attempt to evade detection while executing in a virtualized environment is the use of a sleep function. Specifically, the malware may attempt to sleep for an extended period of time—either through repeated sleep calls or through a single, lengthy sleep. In some embodiments, system 132 is configured to modify the behavior of the sleep function through API-hooking. For example, a maximum sleep duration can be specified. As another example, repeated calls to sleep can be marked as suspicious and/or subsequent sleeps can be ignored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to:
   receive a candidate malware potentially including at least one malicious element;
a processor configured to:
   execute the candidate malware using a virtualized environment;
   determine that the candidate malware, while executing using the virtualized environment, has performed at least one anti-virtual machine action, wherein the at least one anti-virtual machine action comprises: (1) an attempt to detect whether the virtualized environment has been hotpatched; and (2) an attempt to revert a hotpatch applied in the virtualized environment; and
   in response to the determination that the candidate malware, while executing using the virtualized environment, has taken at least one anti-virtual machine action, generate as output an alert that the candidate malware is malicious; and
a memory coupled to the processor and configured to provide the processor with instructions.

2. The system of claim 1 wherein generating the alert includes generating a signature associated with the candidate malware that indicates that the candidate malware is malicious.

3. The system of claim 1 wherein the processor is further configured to determine whether the candidate malware, while executing using the virtualized environment, attempts to check whether the candidate malware is running in a virtualized environment.

4. The system of claim 1 wherein the processor is further configured to determine whether the candidate malware, while executing using the virtualized environment, attempts to ascertain a product identifier of an operating system.

5. The system of claim 1 wherein the processor is further configured to generate a random product identifier for use by the virtualized environment.

6. The system of claim 1 wherein the processor is further configured to determine whether the candidate malware attempts to ascertain a computer name.

7. The system of claim 1 wherein the processor is further configured to generate a random computer name for use by the virtualized environment.

8. The system of claim 1 wherein the processor is further configured to determine whether the candidate malware attempts to ascertain an identifier of a hard drive.

9. The system of claim 1 wherein the processor is further configured to generate a random hard drive identifier for use by the virtualized environment.

10. The system of claim 1 wherein the processor is further configured to determine whether the candidate malware attempts to ascertain a MAC address.

11. The system of claim 1 wherein the processor is further configured to generate a random MAC address for use by the virtualized environment.

12. The system of claim 1 wherein the processor is further configured to determine whether the candidate malware includes at least one virtualized environment-specific opcode.

13. The system of claim 1 wherein the processor is further configured to apply one or more hotpatches.

14. The system of claim 1 wherein the processor is further configured to confirm that a previously applied hotpatch is still in effect.

15. The system of claim 1 wherein the processor is further configured to determine whether the candidate malware, while executing using the virtualized environment, attempts one or more sleep actions.

16. A method, comprising:
receiving a candidate malware potentially including one malicious element;
executing the candidate malware using a virtualized environment;
determining that the candidate malware, while executing using the virtualized environment, has performed at least one anti-virtual machine action, wherein the at least one anti-virtual machine action comprises (1) an attempt to detect whether the virtualized environment has been hotpatched; and (2) an attempt to revert a hotpatch applied in the virtualized environment; and
in response to the determination that the candidate malware, while executing using the virtualized environment, has taken at least one anti-virtual machine action, generating as output an alert that the candidate malware is malicious.

17. The method of claim 16 further comprises determining whether the candidate malware, while executing using the virtualized environment, attempts to check whether the candidate malware is running in a virtualized environment.

18. A computer program product embodied in a non-transitory computer readable storage medium and comprising computer instructions for:
receiving a candidate malware potentially including one malicious element;
executing the candidate malware using a virtualized environment;
determining that the candidate malware, while executing using the virtualized environment, has performed at least one anti-virtual machine action, wherein the at least one anti-virtual machine action comprises (1) an attempt to detect whether the virtualized environment has been hotpatched; and (2) an attempt to revert a hotpatch applied in the virtualized environment; and
in response to the determination that the candidate malware, while executing using the virtualized environment, has taken at least one anti-virtual machine action, generating as output an alert that the candidate malware is malicious.

19. The method of claim 16 further comprising applying one or more hotpatches.

20. The method of claim 16 further comprising confirming that a previously applied hotpatch is still in effect.

* * * * *